(12) United States Patent
Furlong (10) Patent No.: US 12,213,457 B2
(45) Date of Patent: Feb. 4, 2025

(54) EGG LAYING DEVICE

(71) Applicant: ONFARMHATCHING LTD, Bristol (GB)

(72) Inventor: Leon Furlong, Bristol (GB)

(73) Assignee: ONFARMHATCHING LTD, Bristol (GB)

( * ) Notice: Subject to any disclaimer, the term of this patent is extended or adjusted under 35 U.S.C. 154(b) by 52 days.

(21) Appl. No.: 17/996,456

(22) PCT Filed: May 6, 2021

(86) PCT No.: PCT/GB2021/051097
§ 371 (c)(1),
(2) Date: Oct. 18, 2022

(87) PCT Pub. No.: WO2021/224627
PCT Pub. Date: Nov. 11, 2021

(65) Prior Publication Data
US 2023/0189765 A1 Jun. 22, 2023

(30) Foreign Application Priority Data

May 6, 2020 (GB) ..................................... 2006700
Mar. 9, 2021 (GB) ..................................... 2103247

(51) Int. Cl.
*A01K 43/00* (2006.01)
*A01K 41/06* (2006.01)
(52) U.S. Cl.
CPC .............. *A01K 43/00* (2013.01); *A01K 41/06* (2013.01)

(58) Field of Classification Search
None
See application file for complete search history.

(56) References Cited

U.S. PATENT DOCUMENTS 1,149,225 A    8/1915    Smith
1,192,305 A    7/1916    Heil
(Continued)

FOREIGN PATENT DOCUMENTS

RU    2048088 C1    11/1995
SU     689648 A1    10/1979
WO    2017/195128 A1    11/2017

OTHER PUBLICATIONS

International Preliminary Search Report and Written Opinion on Patentability for corresponding PCT/GB2021/051097 mailed on Sep. 11, 2021.

*Primary Examiner* — Joshua J Michener
*Assistant Examiner* — Henry Hooper Mudd
(74) *Attorney, Agent, or Firm* — Renner, Otto, Boisselle & Sklar, LLP (57) ABSTRACT

An egg placing machine cassette for receiving eggs to be laid upon a surface. The eggs being received in a two-dimensional array and wherein the cassette comprises a base portion, side walls extending from a first end of the base portion and a lid portion that is connected to a second end of the side walls, that second end being distal from the base portion. The cassette is provided with a first opening mechanism, by which a setter tray is able to be placed inside the cassette. The cassette is further provided with a second opening mechanism, in which the lid portion can be partially and/or progressively opened to allow a predetermined number of eggs to be removed therefrom.

16 Claims, 3 Drawing Sheets

(56) References Cited

U.S. PATENT DOCUMENTS

| | | | |
|---|---|---|---|
| 1,347,397 A | 7/1920 | Newman | |
| 4,180,176 A | 12/1979 | Galer | |
| 4,344,730 A * | 8/1982 | Dvorak | B65G 65/30 |
| | | | 414/405 |
| 5,568,791 A * | 10/1996 | Dratt | A01K 41/06 |
| | | | 119/300 |
| 10,065,813 B2 * | 9/2018 | Vander Hoek | B65G 65/23 |
| 2022/0361457 A1 * | 11/2022 | Vervaeke | A01K 31/16 |

* cited by examiner

EGG LAYING DEVICE

This application is a national stage filing of PCT/GB2021/051097 filed on May 6, 2021. Which is herein incorporated by reference in its entirety.

FIELD OF THE INVENTION

The invention relates to a device for setting eggs down onto a surface, particularly for use in the field of poultry farming for setting eggs onto the floor of a poultry enclosure for the purpose of hatching fertile eggs. The invention may incorporate the inversion of a cassette for selective distribution of eggs therefrom. Additionally, a navigational and control arrangement for the device is set out herein. The process of hatching eggs on the floor of a poultry enclosure is commonly known as "on farm hatching".

BACKGROUND TO THE INVENTION

Industrial hatcheries take fertilised eggs that are then incubated for a period of time. At around eighteen days into the incubation period, the eggs are transferred to hatchers that have large flat-bottomed trays in which the eggs sit. These are transferred to units in which the environmental conditions are artificially created to encourage hatching of a chick from the egg. As an example, a large hatcher may be around 3.3 metres by 1.8 metres and has capacity for around 15,800 eggs. Oftentimes, whilst in the hatcher, the chick emerges after a day or two, but the tray may not be removed from the hatcher for up to three days, which means that the chick has to survive for several days without access to water and with limited, or no, food available. Thus, the chick begins its life in a weakened state and may require more antibiotics than healthy chicks.

It has been known for many years that if eggs are hatched on the floor of a poultry house, the chicks are healthier and access to food and water can be readily provided. This results in healthier chicks that grow bigger and faster than those from hatchers, requiring 5% to 10% less feed to achieve the desired weight and have a healthier immune system; however, transferring the eggs from an incubator to the litter of a poultry shed floor can be time-consuming and requires delicate handling of the eggs to ensure that they are not damaged in the setting process.

Some machines for setting eggs on the floor of a poultry shed have been proposed; however, they are often expensive, complicated to use and can be unreliable. One such device employs a cup and a vacuum pump therein to lift each egg and transfer it to the floor. A problem with such a device is that the vacuum pumps require a great deal of energy and a good seal between the cup and the egg must be maintained to avoid the egg dropping and breaking. Thus, these machines can be expensive to construct and they have high power requirements to ensure a reliable vacuum. Additionally, they are complex to control and prone to mechanical failure due to the forces involved in using suction to lift the eggs.

In other existing arrangements, complex and heavy installations are required to install a lengthy track, which holds hatching trays with a supporting structure along the length of the shed and to fit a system thereto, however, these are expensive, and each poultry house requires its own support installation and egg setting device. Furthermore, such an arrangement request that the weight of the device is supported by the poultry house, which is a challenge for the structural integrity of the building. After installation, the trays on the egg layer system have to be removed after the chicks have hatched. This involves a large amount of time during poultry rearing cycle. Additionally, the installed structure needs to be deep cleaned after the birds have been removed from the house and then elevated towards the roof of the building to evade damage during the cleaning process at the end of the rearing cycle.

A further problem with existing egg placing machines is that they often slip on the litter of the poultry house whilst placing the eggs. This can cause problems in respect of the machine placing eggs in an efficient manner or, in some cases, destroying eggs that are already placed by running over them.

SUMMARY OF THE INVENTION

Broadly, the invention relates to the inversion of an egg-containing cassette so that eggs contained therein can be released onto the floor of a poultry house. The egg-containing cassette can be loaded into a dispensing machine and the cassette is subsequently inverted and the eggs can be selectively dispensed from the dispensing machine onto litter in a poultry house. A navigational system for an egg-dispensing device is also set out herein that may be incorporated into the aforementioned dispensing machine.

Accordingly, the present invention is directed to an egg placing machine cassette for receiving eggs to be laid upon a surface, the eggs being received in a two-dimensional array, wherein the cassette comprises:
 a base portion;
 side walls having a first end extending from the base portion; and
 a lid portion connected to a second end of the side walls, that second end being distal from the base portion;
 wherein the lid portion of the cassette is provided with:
 a first opening mechanism, by which a setter tray is able to be placed inside the cassette; and
 a second opening mechanism, in which the lid portion can be partially and/or progressively opened to allow a predetermined number of eggs to be removed therefrom.

The cassette is adapted to allow an egg-containing setter tray to be placed inside by way of the first opening mechanism, which may be the whole lid portion opening to allow the setter tray to be placed therein, or it may be the opening of one or more side walls to provide an opening for the setter tray. Subsequently, when the tray is in an egg dispensing or setting machine, the eggs can be dispensed selectively using the second opening mechanism. This allows for quick loading of the cassette and progressive and selective unloading of the cassette. It will be appreciated that the lid portion may be integral with the cassette or may be removeable therefrom.

Where a side wall opening is employed to load the setter tray into the cassette, it will be appreciated that once the eggs have been dispensed, the setter tray may be ejected by the same side wall opening or through a different side wall opening, for example an opposing side wall or an adjacent side wall. Similarly, where the lid is employed for loading the setter tray into the cassette, the setter tray may be removed either through the lid opening or through a side wall.

In a preferred arrangement, the internal surface of the lid portion that faces the base portion is provided with cushioning material. Once the cassette is placed into an egg placing machine, it is rotated, or flipped, so that the lid portion becomes the portion of the cassette that is closest to the ground. Therefore, the cushioning material reduces the risk of damage to the eggs during the flipping process and whilst the eggs rest against the lid.

Advantageously, the second opening mechanism is selected from a group comprising: a plurality of flaps that can be pivotally opened independently from one another; and a plurality of bars, at least some of which can be moved relatively to other bars. Alternatively, a sliding mechanism may be applied to the flaps or bars to allow the selective opening. By employing flaps or bars, the eggs can be selectively released from the cassette by opening, or sliding, the flaps or adjusting the position of at least some of the bars. Both provide reliable and predictable arrangements for releasing eggs from the cassette. Thus, it may be that the second opening mechanism is in the form of a plurality of blades, rods or bars, wherein the blade, rods or bars are set out in groups and the groups are operated to selectively dispense a respective set of eggs. The bars may be circular, oval, flat or another shape, depending upon the requirements, and they may be providing with a cushioning mechanism or covering to assist with protecting the eggs.

In an alternative arrangement, the first opening mechanism and the second opening mechanism are the same and comprise a top sheet that can be withdrawn across the top of the walls to expose the eggs. It is envisaged that the opening mechanism may be in the form of the top sheet, for example, a sliding panel or a retractable film, that can be progressively slid or peeled from the cassette to expose the eggs and release them from the cassette. A conveyor arrangement may be employed to slide the lid section from the cassette.

It is particularly advantageous that the second opening mechanism can be selectively opened to expose a row of eggs in the egg setter tray. By exposing a row of eggs at a time, the eggs can be released from the cassette in an ordered and predictable manner.

Preferably, the external surface of the cassette is provided with at least one part of a guide connection mechanism that can engage with a guide element of an egg placing machine. The provision of a part of a guide mechanism enables the cassette to engage a corresponding part of a guided or track so that the cassette can be manoeuvred and/or transported. The first part of the guide connection mechanism may be positioned on the base portion or at least one of the side walls.

In one advantageous arrangement, the cassette is adapted to receive and retain a setter tray. Thus, a setter tray, which normally receives eggs, can be placed directly into the cassette, thereby reducing the handling of the eggs. It is further advantageous that the cassette is provided with an engaging, or retention, mechanism to engage the setter tray and retain it within the cassette. This not only keeps the setter tray held in place during linear movement, but it also retains the setter tray in place when the cassette is inverted, which, in turn, keeps the eggs in the required position for dispensing from the cassette.

Where a setter tray is to be placed within the cassette, it is useful that the length of at least two of the side walls is adjustable to accommodate different widths of setter trays. Such an arrangement allows different sizes and types of setter trays to be used with a single cassette, with the cassette being adaptable to different size trays. Thus, different setter trays from different providers may be used with the cassette, which can allow the device to be used with different type of poultry.

It one embodiment, the base portion of the cassette may be height adjustable, relative to the lid portion and/or the side walls. Thus, once the setter tray has been fed into the cassette, either via the lid portion or a side wall, the base portion may be moved, relative to the lid portion and/or the side walls, to more firmly hold the setter tray in place. This enables the setter tray to be securely held within the cassette, reducing the risk of movement of the setter tray within the cassette, thereby reducing the risk of the eggs therein being damaged. A further advantage of such an arrangement is that the cassette can compensate for variations in the depth of the setter tray.

In one arrangement, the lid portion may be moveable relative to the base portion. This may allow the lid portion to be raised to allow the insertion of an egg setter tray, before being closed. In one arrangement, the lid is moved towards the egg setter tray, which may involve the lid portion moving below the top of the walls, in order to reduce the distance between the eggs and the lid portion. By reducing the distance between the eggs in the egg setter tray and the lid portion, or more specifically, the second opening mechanism of the lid portion, the risk of damage to the eggs is reduced. In use, the cassette is inverted, or flipped, so that the eggs can be dispensed from the cassette through via the second opening mechanism, and the reduction in the distance between the eggs and the lid portion, can reduce the risk of mechanical damage to the eggs, particularly when the lid portion and/or second opening mechanism is provided with a cushioning material.

The invention extends to an egg setting machine comprising:
  a cassette receiving section for receiving one or more cassettes as described herein;
  guide elements for guiding the cassettes around a circuit;
  a base element; and
    a propulsion system to move the machine;
  wherein the guide elements invert the cassette so that the lid of the cassette is facing the floor and wherein the machine is provided with an activation element that, when triggered, activates the second opening mechanism to selectively dispense eggs from the cassette.

The machine is a vehicle that can travel through a poultry shed and dispense eggs on the litter in a regulated and controlled manner, thereby allowing chicks to hatch in a more natural manner. It is envisaged that between 30,000 and 60,000 eggs an hour can be placed on a poultry shed floor using the present invention. The machine is portable and can be moved between sheds, although it will be appreciated that cleaning of the machine between sheds may be required.

The guide elements may be in the form of a conveyor mechanism, a rotating drum, a yoke or a chain, each of which engages with the cassette and inverts it so that the lid portion is proximal the floor. Each of these guide mechanisms may be raised or lowered as required as the cassette is inverted. This ensures that the leading edge of the cassette does not descend below a desired height, particularly to a position in which eggs have been, or will be, set down. In this manner, the second opening mechanism can be used to selectively dispense the eggs from the machine. In one arrangement, the cassette is connected to an arm that rotates about a spindle and, preferably, two or more arms are attached to the spindle and rotated thereround. This can allow one cassette to provide counter-weight to another cassette, thereby reducing the power required to rotate the arms. It may be that the cassette is fixed to a rotating structure that rotates around a central axis, which may include a seat element or a holder in which the cassette may be releasably received.

Preferably, the machine further comprises at least one plough element to prepare the surface onto which the eggs are to be placed. Thus, the machine is able to prepare the litter onto which the eggs will be placed by using the plough element to create a V-shape, or other desired shape, in the litter. This shaped litter is more readily able to cushion the egg on delivery and then support the egg once it has been set down. Additionally, shaping the litter conditions and prepares it to the best height and shape for receiving the egg. The plough element may be in the form of a roller, with an optional brush element, the roller having a V-shaped protrusion to deflect the litter, or shavings, to the side whilst creating a level surface. This creates small furrows that reduce the risk of sideways movement of the eggs once set down. A brush may be placed behind the plough element to further smooth the litter. A plough, brush and roller may be used in combination to prepare the litter for receiving the eggs.

The machine may further comprise one or more deflector plates to separate the eggs laterally from one another. As fertile eggs generate heat, in order to give the eggs sufficient space to keep them cool and to hatch without damaging other eggs, deflector plates and be employed to laterally separate the eggs as they are set on the litter. The deflector plates may be metal and coated in rubber or plastics material or they may be manufactured from rubber or plastics material. Additionally, they may be changeable according to the material of the litter and also adjustable to vary the degree of deflection.

The eggs may be laid down in a position that will reduce the chance of the chick breaking through the shell, which is referred to as the 'point end up', after which, the eggs should be rolled onto their side, as they would in nature, so that the chick can easily hatch. Thus, in one arrangement, the machine may be provided with a positioning element, which may be in the form of a brush or a roller to orientate the placed eggs. This element may be arranged at the rear of the machine, wherein a brush or roller is used to orientate the eggs on their sides, so that they are in the best position for hatching. The egg can be positioned either point down or on its side and the positioning element is able to orientate the egg on the litter. In one arrangement, both a brush and a roller can be arranged on the machine so that the roller, or a cushioned bar, caresses the egg onto its side and a brush follows the roller to continue the laying process.

Where the eggs are dispensed in groups, a first group of eggs can be set down in a first position, the machine moved forwards and a second group of eggs can be set down in a second position. This is particularly advantageous where the groups are set to be alternate rows of eggs within the cassette, because the dispensing of alternate rows of eggs and assist with the spacing of the eggs, thereby reducing the risk of overheating.

A sensor may be employed to ensure that the eggs are a set distance from the floor prior to being dispensed. This reduces the risk of the eggs being dropped from a height that might cause them to be damaged. Additionally, or alternatively, the height of the machine chassis and/or height of the guide mechanism connected to the chassis, may be adjusted, which may be undertaken by way of pneumatic and/or hydraulic mechanisms and actuators or by electric motors. Alternatively, the relative heights of the guide mechanism, rotating axis and/or chassis may be manually adjusted to the desired height. The height adjustment of the machine may be controlled by way of various threaded elements, including screws or gears such as worm gears, or by positional mechanisms, preferably on each corner of the machine to provide a consistent height on uneven surfaces. Sensors can be employed to monitor the height of the chassis from the litter of the poultry shed and the height may be automatically adjusted.

The invention may extend to an egg setting machine receiving trailer that receives the egg setting machine when it is not being used. The trailer may comprise wired or wireless charging elements so that the machine can be charged when not in use. Furthermore, the trailer may comprise a decontamination system. The decontamination system may be in the form of a fluid dispersing system, which may include a chemical cleaning system.

Thus, where the machine is moved between sites, it can be decontaminated, where required.

The present invention may extend to an egg placing machine comprising:
 a chassis; and
 a propulsion system;
 wherein the egg placing machine is further provided with navigational system to allow the machine to follow a predetermined path.

Thus, the egg placing machine may be provided with a navigational system to monitor the movement of the machine. The machine may be provided with wheels or tracks and a steering mechanism associated therewith. The propulsion of the machine and the steering allows, in combination with a navigational system, allows the device to set eggs onto the floor in a predictable and efficient manner.

The navigational system may be manual, but is preferably automatic, thereby allowing a use to monitor, rather than actively control the machine. It will be appreciated that manual control may, in some situations, be desirable, in which case a control device may be employed, thereby allowing an operator to control the movement and steering of the machine.

In one arrangement, the navigational system comprises a laser alignment system. Thus, a laser may be directed to a desired target and monitored to guide the machine in a preferred direction.

It is advantageous that the navigational system comprises at least one accelerometer and/or at least one gyroscope. The accelerometer and/or gyroscope assists with monitoring the movement of the machine and ensuring that a desired path is achieved.

Preferably, the egg placing machine is provided with a local positioning receiver. The use of a local positioning system allows for the monitoring of the machine relative to a plurality of fixed points. The local positioning system may employ a plurality of signal emitters and at least one receiver to allow the relative position of the machine to be determined.

It is particularly advantageous that the machine comprises a steering system that is linked to the navigational system so that corrections to the direction of travel can be made. Where the steering system is connected to the navigational system, the machine can make corrections to its direction of travel in order to keep as close as possible to a predetermined path. Whilst the corrections may be made manually, an automated system that links the navigational system to the steering of the machine provides more efficient movement of the machine.

The egg placing machine, preferably, comprises a cassette receiving section for receiving at least one cassette containing eggs, wherein the machine is provided with an activation element that, when triggered, activates a selective opening mechanism to selectively dispense eggs from the cassette. It is further preferable that the cassette is inverted in a manner described herein to dispense eggs onto the floor of the poultry house.

In an advantageous arrangement, the machine further comprises at least one plough element to prepare the surface onto which the eggs are to be placed and, an a further advantageous arrangement, the machine further comprises deflector plates to separate the eggs laterally from one another as they are dispensed from the egg placing machine. The preparation of the litter onto which the eggs are to be placed and the arrangement of the eggs onto the surface allows for the eggs to be dispensed in a manner that makes increases the likelihood of successful hatching.

BRIEF DESCRIPTION OF THE DRAWINGS

Embodiment of the invention will now be described, by way of example only, and with reference to the accompanying drawings, in which.

DETAILED DESCRIPTION OF EXEMPLARY EMBODIMENTS

Figure 1:
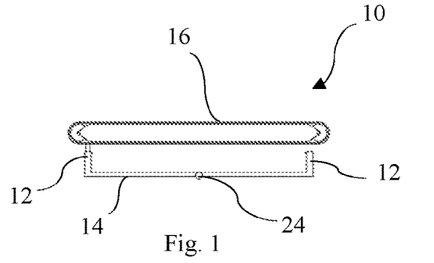
FIG. 1 shows a first cassette in accordance with the present invention.
Figure 2:
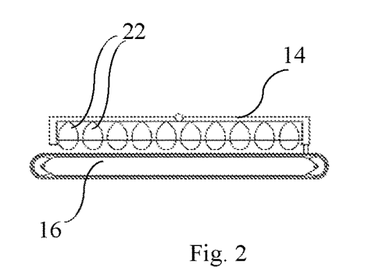
FIG. 2 shows a further view of the cassette of FIG. 1.
Figure 3:
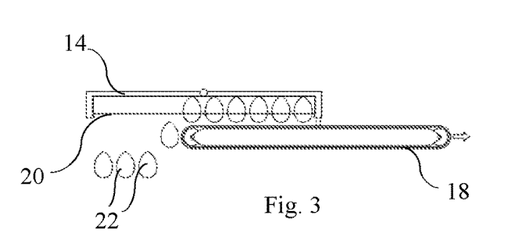
FIG. 3 shows another view of the cassette of FIG. 1.

FIGS. 1 to 3 show a cross-sectional view of a cassette 10 for use in an egg setting machine 50, 60 or 70. The cassette has a pair of opposing side walls 12 connected to a base portion 14. A lid portion 16 is provided in the form of a cushioning conveyor element 18. The lid portion 16 can be retracted to allow the insertion of a setter tray 20 containing eggs 22. A guide element 24 is provided on the base portion 14 that can be used to engage the cassette 10 on a track or circuit.

In use, the setter tray 20 is placed within the cassette 10 and the lid portion 16 closed. The cassette 10 is placed into an egg setting machine as shown herein and, during the setting process, is flipped so that the lid portion 16 becomes the lower surface of the cassette 10. When the eggs 22 are to be released from the cassette 10, the conveyor element 18 is operated so that it is retracted, or 'pulled back', to expose the eggs 22 and allow them to be dispensed, as shown in FIG. 3. Once the eggs 22 have been dispensed, the conveyor lid 18 can be moved back into position to close the cassette 10.

It will be appreciated that a roller may be employed, and a sheet material used as the lid portion so that the roller is operated to slide the lid portion between the open and closed positions.

Figure 4:
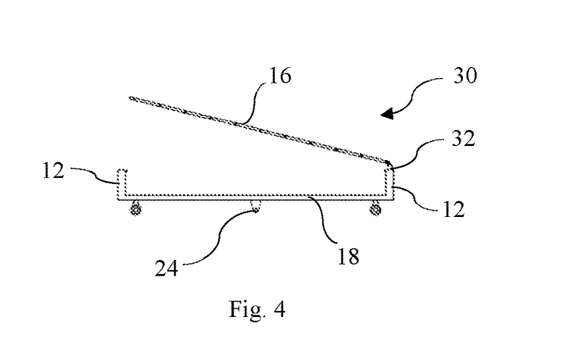
FIG. 4 shows a second cassette in accordance with the present invention.
Figure 5:
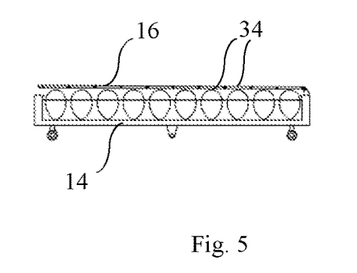
FIG. 5 shows a further view of the cassette of FIG. 4.
Figure 6:
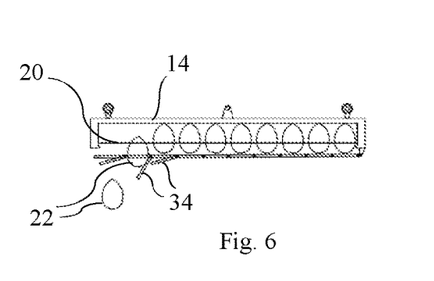
FIG. 6 shows another view of the cassette of FIG. 4.

FIGS. 4 to 6 show a cross-sectional view of a cassette 30 having opposing side walls 12, a base portion 14 and a guide element 24 as with cassette 10 shown in FIGS. 1 to 3. The lid portion 16 of the cassette 30 comprises a pivot element 32 to allow the whole of the lid portion 16 to be pivoted open to allow access to the inside of the cassette 30. Additionally, the lid portion 16 is further provided with a plurality of flaps 34 that are individually pivotable. Thus, the lid portion 16 has two opening mechanisms; the whole lid can be opened to allow access to the cassette 30 by pivoting the lid portion 16 at pivot element 32, or the individual flaps 34 can be opened by pivoting them, thereby creating a smaller opening that is sized to release a row of eggs 22. The internal surface of the lid 16 is provided with a cushioning material (not shown) to assist with cushioning the eggs 22 during the inversion process. It will be appreciated that individual flaps for each egg may be provided, in which case each row will have a plurality of flaps.

In use, the lid portion 16 is pivoted to allow full access into the cassette 30 and a setter tray 20 containing eggs 22 is inserted into the cassette 30 and is retained therein by way of a holding, or retaining, mechanism (not shown). During the dispensing process, the cassette 30 is inverted so that the lid portion 16 is closest to the floor, the eggs 22 being cushioned during the inversion process by the internal cushioning layer. When the eggs 22 are to be dispensed, the flaps 34 are pivoted from a closed position to an open position, one flap 34 at a time. The opening of the flap 34 allows the eggs 22 held thereunder to be dispensed from the cassette 30 and the lid flap 34 can be used to gently roll the egg 22 and direct it as it is dispensed from the cassette 30. Once the eggs 22 under the respective flap 34 have been dispensed, the flap 34 may be closed to avoid interfering with the subsequent flap 34 and eggs 22 dispensed therefrom. It will be appreciated that some or all of the flaps 34 can be left open and all closed once the eggs 22 have been released from the cassette 30. The flaps 34 may be controlled by a mechanical lever or by a solenoid and they may be sprung so that they are biased to the closed position, so that when the egg 22 is released, they return to the closed position.

Figure 7:
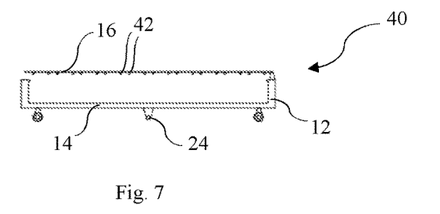
FIG. 7 shows a third cassette in accordance with the present invention.
Figure 8:
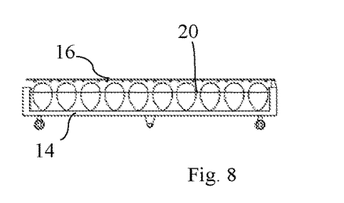
FIG. 8 shows a further view of the cassette of FIG. 7.
Figure 9:
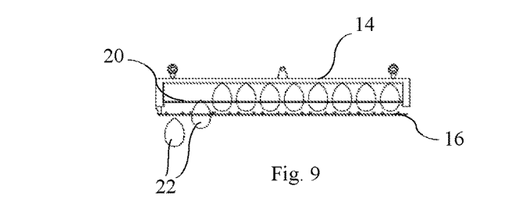
FIG. 9 shows another view of the cassette of FIG. 7.

FIGS. 7 to 9 show a cross-sectional view of a cassette 40, which is provided opposing side walls 12, a base portion 14 and a guide element 24, as with the previously described cassettes 10 and 30. The lid portion 16 in this arrangement can be opened by either lifting it or by pivoting it, as with the cassette 30 of FIGS. 4 to 8. Additionally, the lid portion 14 of cassette 40 is provided with a series of pairs of bars 42, that may be coated in rubber or polytetrafluoroethylene, or similar reduced friction material, and/or provided with sculpted rubber bungs thereupon. The relative distance between the pairs of bars 42 can be adjusted so that in a first position, they are closer together than in a second position. When in the first position, the bars 42 are sufficiently close together to be less than the width of an egg, thereby allowing an egg 22 to sit atop of the bars 42. In the second position, the bars 42 have a gap therebetween that is greater than the width of an egg 22, thereby allowing it to pass between the bars 42. The adjustment of the bars 42 can be put into effect by the use of a rotating cog or by a cam connected to part of the device in which it is located, for example, the wheels of an egg setting machine. One of the pair of bars 42 may be fixed and the other of the pair of bars 42 move relative to the fixed bar. Alternatively, both bars of the pair may be moveable or retractable. The position of a single bar may be adjusted to release the egg or eggs.

When in use, the setter tray is inserted into the cassette 40 and retained therein, as with the other cassettes 10 and 20. The cassette 40 is subsequently inverted so that the lid portion 14 becomes the lower-most surface and the eggs 22 rest against the bars 42 with the bars 42 in the first position. The bars 42 are sequentially opened to allow rows of eggs 42 to be dispensed from the cassette 40.

Figure 10:
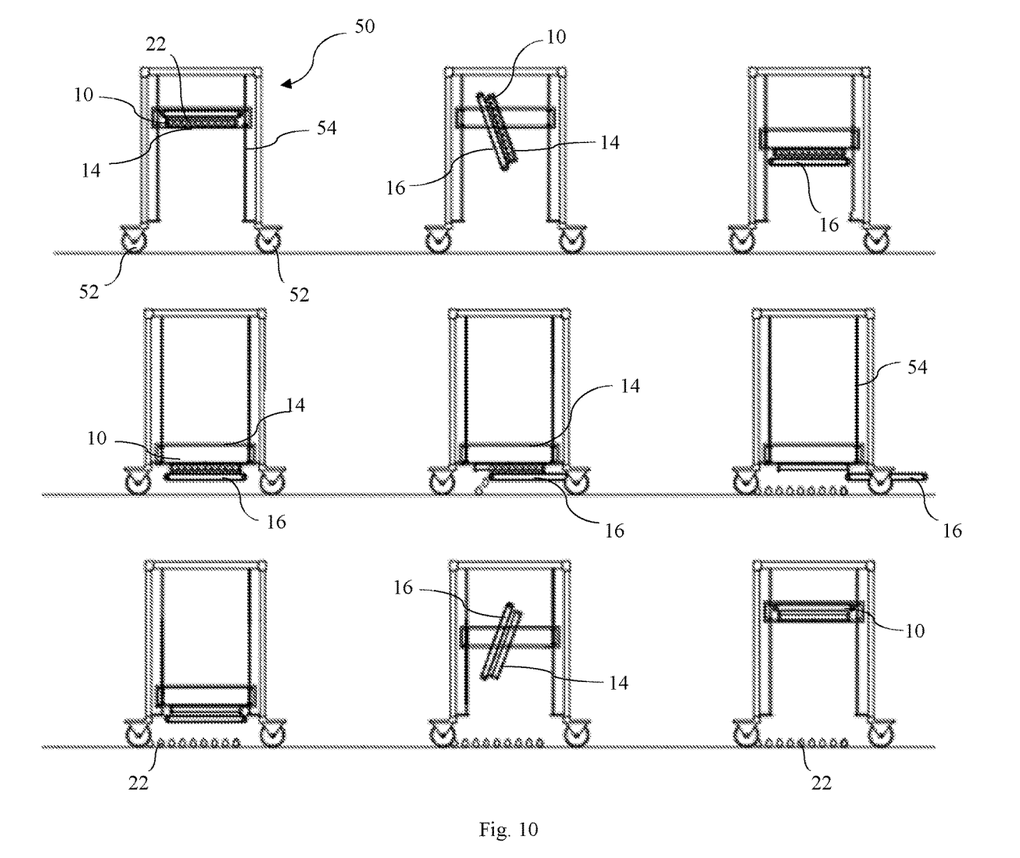
FIG. 10 shows a machine in accordance with the present invention and steps in its cycle of operation.

FIG. 10 shows a schematic view of an egg setting machine 50 and the process of laying eggs on the floor of a poultry shed. The machine 50 comprises rubber wheels 52 and a propulsion mechanism, which is preferably a battery-operated motor, and a guide mechanism 54 that can guide the cassette 10 around the internal volume of the machine 50.

In the starting position, as shown in the top left figure, a cassette 10 is loaded into the machine 50 and the guide element 24 of the cassette engages into a guide mechanism 54. The cassette is lowered towards the ground and sensors are employed to lower the cassette to a pre-determined height above the litter on the ground, which should provide a drop distance of approximately 1 cm. During the lowering process, the cassette 10 is rotated so that the lid portion 16 of the cassette 10 is inverted to become the surface that is closest to the floor. At this stage, as shown in the middle left drawing, the machine is primed and ready to dispense eggs 22.

The machine 50 moves along the floor of the poultry shed and as it moves the cassette 10 is progressively opened to allow the eggs 22 to be selectively dispensed from the cassette 10 onto the floor of the poultry shed.

Once the eggs 22 have been dispensed, the cassette 10 is closed and the guide mechanism 54 raises the cassette 10 back to the top of the machine 50, rotating it at the same time so that the lid portion 16 faces upwards again. Once the cassette 10 is at the top of the machine 50 again, it can be removed and replaced with a cassette containing more eggs.

Figure 11:
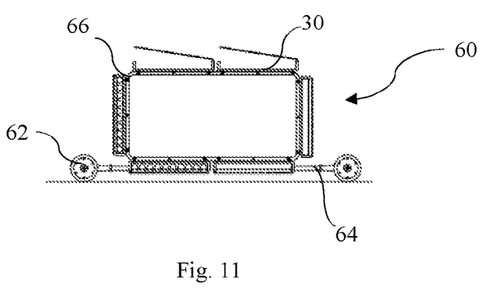
FIG. 11 shows a second machine in accordance with the present invention.
Figure 12:
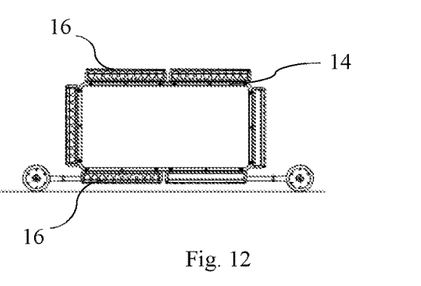
FIG. 12 shows a further view of the machine of FIG. 11.
Figure 13:
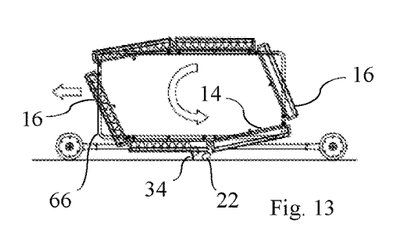
FIG. 13 shows another view of the machine of FIG. 11.

FIGS. 11 to 13 show a partial view of a further egg laying machine 60 comprising wheels 62 on a base chassis 64. A guide mechanism 66 is provided to guide cassettes around the machine 60, the guide mechanism 66 having a circuit around which the cassettes are guided.

A cassette 30 is received at the top of the machine 60 and the guide mechanism on the cassette engages the guide mechanism 66 of the machine 60. Once engaged, the guide mechanism 66 of the machine 60 guides the cassette 30 around the circuit during which the cassette 30 is turned to a vertical orientation, which is to say that they lid portion and base portion of the cassette 60 are substantially perpendicular to the floor. The cassette 30 is then further guided to a position wherein it is inverted, which is to say that the lid portion 16 is proximal to the floor and the base portion 14 is distal therefrom. In this inverted position, the cassette 30 can be progressively opened to dispense the eggs 22 therefrom.

Once the eggs 22 have been dispensed from the cassette 30, the cassette 30 continues around the guided circuit so that it is moved to a substantially vertical position before levelling out at the top of the machine 60 to have the empty setter tray removed and replaced with a filled setter tray or, optionally, to replace the empty cassette 30 a filled cassette 30.

Figure 14:
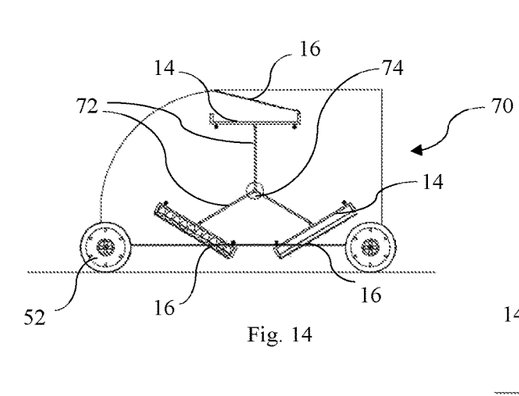
FIG. 14 shows a third machine in accordance with the present invention.
Figure 15:
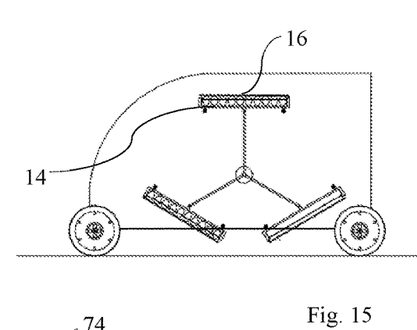
FIG. 15 shows a further view of the machine of FIG. 14.
Figure 16:
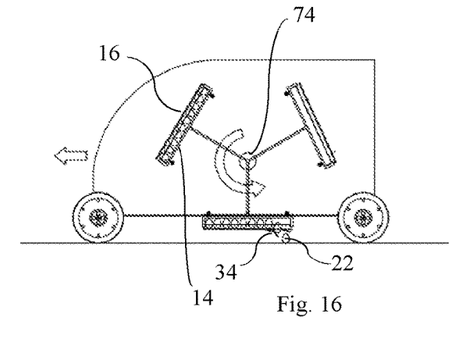
FIG. 16 shows another view of the machine of FIG. 14.

FIGS. 14 to 16 show a partial view of a further egg laying machine 70, wherein the cassettes are loaded onto arms 72 that are connected to a spindle 74, with the guide mechanism 24 on the cassette 30 engaging the arm 72. In this arrangement, the arms 72 are the guide mechanism for the cassette 30 to be guided around the machine 70. The arms 72 can be provided with a spring-loaded concertina element so that they are length adjustable, thereby ensuring that they are at the correct height when the eggs are to be released. This may be required because, with an arcuate path of movement, the height of the cassette 30 may need adjusting as it rotates in order to ensure that the eggs are approximately 1 cm from the ground.

As the spindle 72 rotates, the cassette 10 is rotated around the machine 70 and filled setter trays are loaded into the cassette 30 of the machine 70, with the lid portion 16 of the cassette 30 facing away from the floor to allow the empty setter tray to be removed and the filled setter tray to be inserted. The cassette 30 is rotated and inverted so that the lid portion 16 is adjacent the floor and the base portion 14 is distal from the floor. In this position, due to gravity, the eggs 22 rest against the lid portion 16. As the machine 70 moves along the floor of the poultry shed, the second opening mechanism 34 is operated to progressively and selectively allow the eggs to move from the setter tray in the cassette onto the litter of the poultry shed floor. Thus, the eggs 22 are released from the machine 70 onto the litter and the cassette 30 continues its rotation around the circuit of the machine 70 and is returned to its original position, from the empty setter tray can be removed and a filled setter tray inserted.

In one arrangement, the device shown in FIGS. 14 to 16 may be provided with two arms 72, rather than three arms 72. The use of two arms, rather than three arms allows the empty cassette, which is to say that the eggs have been dispensed from the cassette, to operate as a partial counter-balance to the egg-loaded cassette. The counterbalancing reduces the force required to rotate the spindle, thereby reducing energy consumption. It will be appreciated that four arms, or more, may be employed which may have associated support mechanism for each of the arms and cassettes.

It is advantageous that the front plough and side skirts are provided, along with other safety elements, to reduce the risk of injury to users or poultry. The chassis and other structural elements may comprise stainless steel and the walls may be mesh and/or transparent material to allow the internal workings to be viewed. All of the materials used should, where possible, be chemical resistant to allow for thorough cleaning.

The speed of the machine may be set, for example, to between 1 and 2 kilometres per hour, or at, say, 1.6 kilometres per hour, and a control box may be provided either on the machine or remote therefrom, the latter of which may be connected in a wireless or wired manner. A remote-control box can be provided and a short-range wireless transmitter, for example a short-range radio frequency transmitter, and receiver contained in the machine and in the control box can provide a convenient control arrangement, which may be touch-screen or may have a control stick to adjust the steering on the machine. Additionally, or alternatively, a software application may be installed on a portable device, such as a smartphone or tablet computing device, that allows control of the machine. Thus, the signals may be transmitted over a personal area network, a local area network, a telephone network or via a short-range transmission system. As the machine moves in a forward direction, the eggs are released in the opposite direction, thereby allowing the eggs to be set down in a spaced manner.

Whilst various cassettes have been shown in use with the various machines shown in the figures, any of the cassettes described herein may be used with the various egg setting machines.

The cassettes may comprise a stainless-steel base portion with a lip to retain the setter tray, along with a locking mechanism to retain the setter tray within the cassette. The guide element on the cassette may be an axel about which the cassette may rotate when in the guide mechanism of the machine.

The cassette(s) should be loaded into the machine and the first cassette inverted and readied, or primed, to dispense eggs before the machine moves through the poultry shed. The inversion may be brought about by way of a chain, driven by a motor that rotates the cassette during movement of the cassette down towards the base of the machine. When the eggs have been dispensed, the cassette should, preferably, be closed and returned to the inlet of the machine, at which time the setter tray can be released to allow it to be removed. The cassette may be retained in the machine and setter trays inserted and removed therefrom.

The release of the eggs should be coordinated with the forward movement of the machine so that the eggs are released onto the litter of the poultry shed in a spaced manner. A spigot or protrusion within the machine may trigger the second opening mechanism to selectively open the inverted lid of the cassette. Similarly, a further spigot may be used to close the second opening mechanism. The spigot may form part of the guide mechanism.

It will be appreciated that a setter tray or cassette loading mechanism may be supplied on the machine to load further setter trays or cassettes into the machine, when required. Additionally, or alternatively, the empty setter trays and/or cassettes can be ejected and received in a reception mechanism. These elements can assist with the automation of the egg laying process to reduce the level of manual intervention or interaction.

The machine may be sufficiently wide for several cassettes to be loaded therein adjacent one another, thereby allowing eggs to be dispensed in parallel from adjacent cassettes. Therefore, several trays of eggs may be released onto the floor at the same time to reduce the time needed to set eggs down.

The machine of the present invention is portable so that it can be taken between poultry sheds, as required, rather than being fixed to a single location. Where the machine is transported, it may be in a specific machine-receiving trailer that can disinfect the machine between locations and/or charge the machine.

A laser alignment system or a local positioning system may be employed to ensure that the machine is moved around the poultry shed along a desired path or route. Similarly, one or more cameras may be employed to monitor the position of the machine and to keep provide feedback to a steering arrangement to allow for the machine to be adjusted towards a desired path or route.

It will be apparent that the side walls and/or the base portion of the cassette may also be provided with a cushioning material to cushion any eggs adjacent thereto.

To reduce fumes, the machines disclosed herein are preferably powered by rechargeable electric batteries that may be contained in a sealed container. Wireless charging may be possible using a docking station and inductive charging, which may be located in a storage shed or in a trailer adapted to transport the machine. The machine may be rear wheel driven or, in some arrangements, may be all wheel drive and, whilst automated steering is envisaged with navigation controlled by gyroscopic laser positioning or laser guidance, manual steering may be allowable, to provide user controls should they be required.

In one arrangement, the cassette is provided with a series of substantially parallel bars and the bars are divided into groups. The groups can be arranged so that alternate bars are in alternate groups, thereby creating two groups of bars. In such an arrangement, the bars can be grouped so that the cassette has bars laid out to be A-B-A-B-A-B, with A and B being successive bars. Once grouped, the different groups can be moved alternately, so that group A is moved relative to the frame to release a first set of eggs, whilst group B keeps a second set of eggs in place within the cassette. Subsequently, group A is returned to its previous position and then group B is moved relative to the frame, thereby dispensing the second set of eggs. This allows for the groups of eggs to be dispensed in a quick and simple manner. The result of the arrangement is that rows 1, 3, 5, 7, etc. are dispensed from the setter tray and then rows 2, 4, 6, 8, etc. are dispensed thereafter. In addition to the efficient dispensing of eggs, this also provides a way of spatially separating the eggs on the litter to reduce the risk of overheating. There may be more than two groups, depending upon the dispensing requirements.

Features of one or more embodiments of the present invention described herein may be incorporated into other embodiments disclosed herein.

The invention claimed is:

1. An egg placing machine comprising wheels to allow the machine to move along the floor of a poultry house, and a cassette for receiving eggs to be laid upon a floor of a poultry house, the eggs being received in a two-dimensional array, wherein the cassette comprises:
    a body portion;
    a base portion;
    side walls extending from the base portion and including:
        a first end proximal to the base portion; and
        a second end opposite first end and distal from the portion; and
    a lid portion connected to the second end of the side walls; and
    an interior volume at least partially enclosed by the base portion, the side walls, and the lid portion;
    a tray opening in the body portion configures to enable a setter tray holding eggs to be to be placed inside the interior volume; and
    a lid opening for partially and/or progressively opening the lid portion to allow a predetermined number of eggs to be removed through lid opening and from the setter tray located in the interior volume.

2. An egg placing machine cassette according to claim 1, wherein an internal surface of the lid portion that faces the base portion includes cushioning material.

3. An egg placing machine cassette according to claim 1, wherein the lid opening is selected from a group comprising:
    a plurality of flaps that can be pivotally opened independently from one another; and
    a plurality of bars, at least some of which can be moved relatively to other bars.

4. An egg placing machine cassette according to claim 1, wherein the lid portion comprises a top sheet that can be withdrawn across the top of a side wall to progressively expose and dispense the eggs.

5. An egg placing machine cassette according to claim 1, wherein the lid opening is in the form of a plurality of rods, sliders or bars, wherein the rods or bars are set out in groups and the groups are operated to selectively dispense a respective set of eggs.

6. An egg placing machine cassette according to claim 3, wherein the lid opening is configured to be selectively opened to expose a row of eggs in the egg setter tray.

7. An egg placing machine cassette according to claim 1, wherein an external surface of the cassette is provided with at least one part of a guide connection mechanism that is configured to engage with a guide element of an egg placing machine.

8. An egg placing machine cassette according to claim 1, wherein the cassette is adapted to receive and retain a setter tray.

9. An egg placing machine cassette according to claim 8, wherein the cassette is provided with an engaging mechanism to engage the setter tray and retain it within the cassette.

10. An egg placing machine cassette according to claim 1, wherein the length of at least two of the side walls is adjustable to accommodate different widths of setter trays.

11. An egg placing machine cassette according to claim 1, wherein the tray opening is located in the lid portion or in a side wall.

12. An egg setting placing machine according to claim 1 and further comprising:

a cassette receiving section for receiving one or more cassettes according to any preceding claim;
guide elements for guiding the cassettes around a circuit;
a base element; and
a propulsion system to move the machine;
wherein the guide elements invert the cassette so that the lid of the cassette is facing the floor and wherein the machine is provided with an activation element that, when triggered, activates the lid opening to selectively dispense eggs from the cassette.

13. An egg setting placing machine according to claim 12, wherein the machine further comprises at least one plough element to prepare the surface onto which the eggs are to be placed.

14. An egg setting placing machine according to claim 12, wherein the machine further comprises deflector plates to separate the eggs laterally from one another.

15. An egg setting placing machine according to claim 12, wherein the machine is provided with a positioning element to orientate the placed eggs.

16. An egg placing machine according to claim 12, wherein the cassette is inverted automatically during operation of the machine.

* * * * *